US012747036B1

(12) United States Patent
Hill, IV et al.

(10) Patent No.: US 12,747,036 B1
(45) Date of Patent: Sep. 29, 2026

(54) METHODS AND APPARATUS FOR MULTI-AXIS PRECISION MANIPULATION

(71) Applicant: The Boeing Company, Arlington, VA (US)

(72) Inventors: Chester James Hill, IV, Grafton, IL (US); Christopher Lee Pounds, Mukilteo, WA (US); Philip James Allen, Sammamish, WA (US); Wesley Edward Perrault, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/233,828

(22) Filed: Jun. 10, 2025

(51) Int. Cl.
*B64F 5/10* (2017.01)

(52) U.S. Cl.
CPC .................................... *B64F 5/10* (2017.01)

(58) Field of Classification Search
CPC .. F16C 11/0614; F16C 2326/43; F16C 11/06; B64D 27/40; B64D 27/404; E04B 2001/1969; F22B 13/18; F16D 2125/587; Y10T 403/32311; Y10T 74/20165; Y10T 403/32418; B64F 5/10
See application file for complete search history.

(56) References Cited

U.S. PATENT DOCUMENTS

| | | | | |
|---|---|---|---|---|
| 6,330,995 | B1 * | 12/2001 | Mangeiga | B64D 27/404 244/54 |
| 2008/0303234 | A1 | 12/2008 | Mc Cann | |
| 2019/0176281 | A1 * | 6/2019 | Hafenrichter | B23Q 9/0007 |
| 2025/0178751 | A1 * | 6/2025 | Beach | G01B 5/25 |

FOREIGN PATENT DOCUMENTS

| | | | |
|---|---|---|---|
| EP | 2781453 | A1 | 3/2014 |
| EP | 3135585 | A1 | 8/2016 |

OTHER PUBLICATIONS

European Patent Office, "Extended European Search Report," issued in connection with European Patent Application No. 26159767.8, dated Jul. 13, 2026, 9 pages.

* cited by examiner

*Primary Examiner* — Lee A Holly
(74) *Attorney, Agent, or Firm* — Hanley, Flight & Zimmerman, LLC

(57) ABSTRACT

Methods and apparatus for multi-axis precision manipulation are disclosed. An example apparatus to manipulate a component includes a support, a first mount to be coupled to the component, the first mount operatively coupled to the support via a first ball and socket joint that can rotate relative to the first mount, and a second mount to be coupled to the component, the second mount operatively coupled to the support via a second ball and socket joint that can rotate and translate relative to the second mount.

8 Claims, 13 Drawing Sheets

METHODS AND APPARATUS FOR MULTI-AXIS PRECISION MANIPULATION

FIELD OF THE DISCLOSURE

This disclosure relates generally to tooling/manufacturing and, more particularly, to methods and apparatus for multi-axis precision manipulation.

BACKGROUND

For aircraft applications, parts and/or components can have a significant weight and size. For example, aircraft sections, such as those utilized in the fuselage or the wings, can be relatively large. As a result, it can be difficult to align and couple such large sections. Mating and/or coupling relatively large assemblies or sections can result in misalignment of features and/or parts, thereby necessitating a significant amount of effort and time, as well as specialized equipment.

SUMMARY

An example apparatus to manipulate a component includes a support, a first mount to be coupled to the component, the first mount operatively coupled to the support via a first ball and socket joint that can rotate relative to the first mount, and a second mount to be coupled to the component, the second mount operatively coupled to the support via a second ball and socket joint that can rotate and translate relative to the second mount.

An example mount for supporting a vehicle frame component includes a body having a base with first and second walls extending therefrom at opposing lateral sides, the first and second walls including (i) a circular aperture and (ii) a slotted aperture, the body to be coupled to the vehicle frame component, and a first rotational bearing and a second rotational bearing positioned between the first ands second walls, the first rotational bearing operatively coupled to the circular aperture, the second rotational bearing operatively coupled to the slotted aperture.

An example method of manipulating a first vehicle panel component relative to a second vehicle panel component includes coupling mounts to the first vehicle panel component, the mounts including opposing circular apertures and opposing slotted apertures, wherein rotational bearings are positioned between the opposing circular apertures and the opposing slotted apertures, and moving the mounts to manipulate the first vehicle panel component relative to the second vehicle panel component.

BRIEF DESCRIPTION OF THE DRAWINGS

FIGS. 6A-8B illustrate example manipulation that can be enabled by examples disclosed herein.

Figure 1:
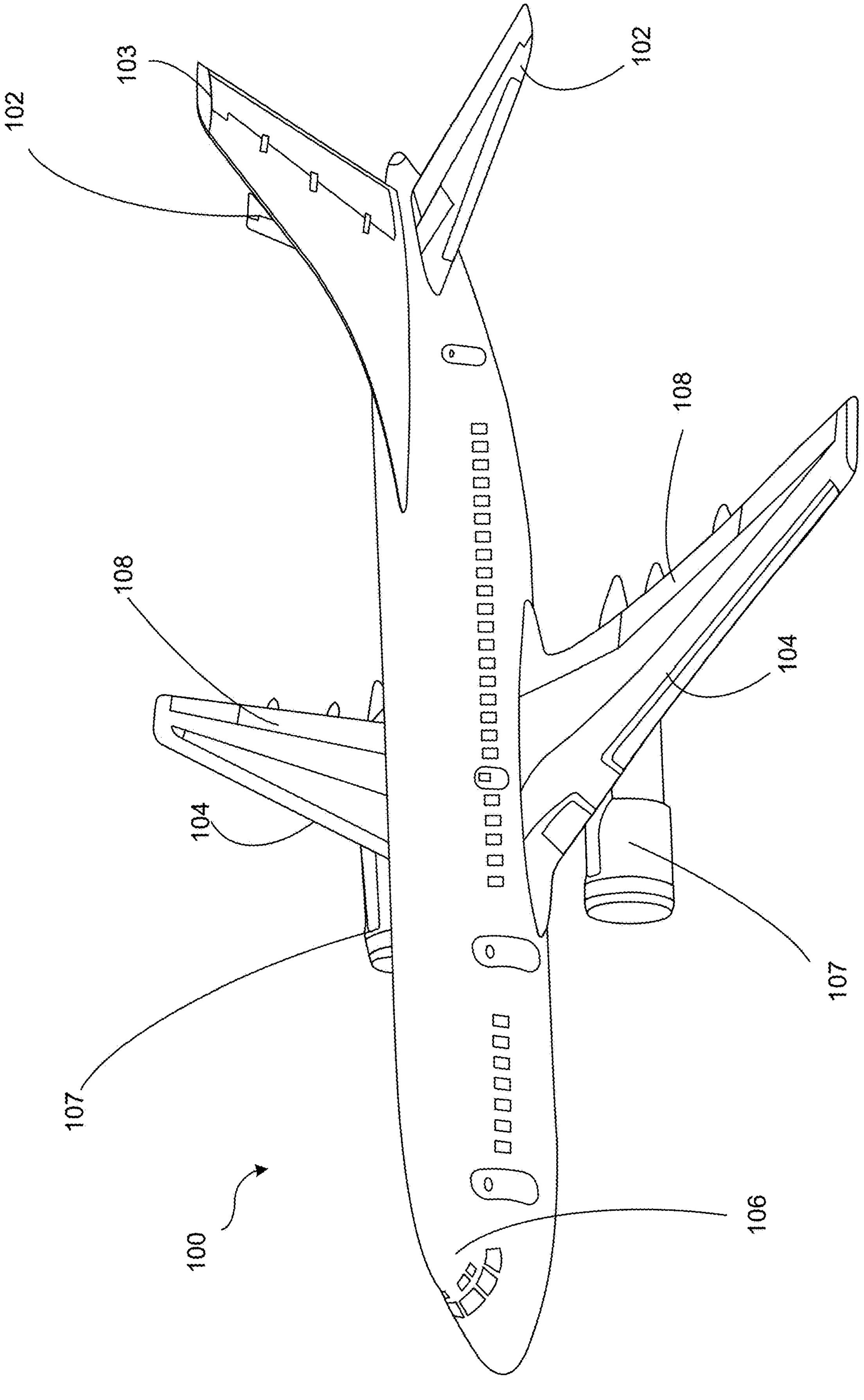
FIG. 1 illustrates an aircraft in which examples disclosed herein can be utilized for the manufacture thereof.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Methods and apparatus for multi-axis precision manipulation are disclosed. In manufacturing environments, handling of relatively large components in combination with their weight distribution can cause the components to be difficult to manipulate. For example, an aircraft fuselage section can be misaligned to another component, such as another section and/or an assembly. In turn, features of the section can be difficult to align with corresponding features of the other section and/or assembly and, thus, assembly and/or handling thereof can be difficult. In particular, alignment of fastener features such as fastener holes can be difficult.

Examples disclosed enable more efficient and time-saving assembly of components by enabling precise manipulation of relatively large components, assemblies and/or sections. Examples disclosed herein also mitigate tolerance issues of relatively large components/sections. While examples disclosed herein are described in the context of aircraft, examples disclosed herein can be applied to any other appropriate type of vehicle assembly and/or structure that is stationary or movable.

Examples herein utilize laterally spaced mounts that are couplable and/or fastenable to a frame component (e.g., an aircraft frame component, a vehicle frame component, an aircraft section, etc.). According to examples disclosed herein, the mounts support and/or align a ball and socket joint, which may be implemented as a rotational bearing (e.g., a spherical bearing, etc.). According to examples disclosed herein, each of the mounts includes a base with lateral walls extending at opposing sides therefrom, thereby defining a c-shaped channel (or u-shaped channel) and/or a clevis (e.g., a clevis lug). According to examples disclosed herein, at least one of the mounts includes a slotted aperture. Further, at least one of the mounts includes a circular aperture. The slotted aperture is utilized to enable the corresponding ball and socket joint to translate as well as rotate, while the circular aperture enables the corresponding ball and socket joint to rotate. Further, a slider can be operatively coupled to and/or include the ball and socket joint. In turn, the slider can move (e.g., displace, translate, rotate, etc.) the ball and socket joint (e.g., via a clevis attachment). The mount can have a clearance (e.g., a lateral clearance, a side clearance, etc.) to at least a portion of the rotational bearing and/or the slider. As a result, examples disclosed herein enable precise manipulation of the frame component in a multitude of directions.

In some examples, the mounts utilize a slotted aperture in combination with two circular apertures. In some such examples, the mounts are arranged in a triangular formation with the mount having the slotted aperture laterally arranged between the circular apertures. Arranging the mounts in a triangular formation includes a minimum of three mounts which can form a plane that enables relatively efficient manipulation of the component. In some other examples, two slotted apertures are utilized in combination with two circular apertures with corresponding mounts spaced laterally apart from one another. Further, examples with four or more mounts can enable enhanced rigidity and/or maneuverability of the component and can be used effectively when configured in such a way as to not cause binding of the mounts.

FIG. 1 illustrates an example aircraft 100 in which examples disclosed herein can be implemented. Examples disclosed herein can be utilized to produce components and/or parts associated with the aircraft 100 and the subassemblies therein. In the illustrated example of FIG. 1, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers.

In the illustrated example of FIG. 1, internal components and/or assemblies are located in the fuselage 106 (and other external components) of the aircraft 100. Examples disclosed herein can be applied to any appropriate internal or external structure and/or vehicle. Accordingly, examples disclosed herein can be utilized for rotorcraft, spacecraft, watercraft, submersibles, unmanned aerial vehicles, or stationary structures, etc. Examples disclosed herein can be utilized for any appropriate structure, assembly and/or subsection to assemble, move and/or orient. Examples disclosed herein can effectively support a section of the fuselage 106. Examples disclosed herein can be applied to any of the horizontal tails 102, the vertical tail 103, the wings (e.g., fixed wings) 104, the fuselage 106, the engines 107, and the control surfaces (e.g., flaps, ailerons, tabs, etc.) 108 (or any other appropriate component of the aircraft 100).

Figure 2A:
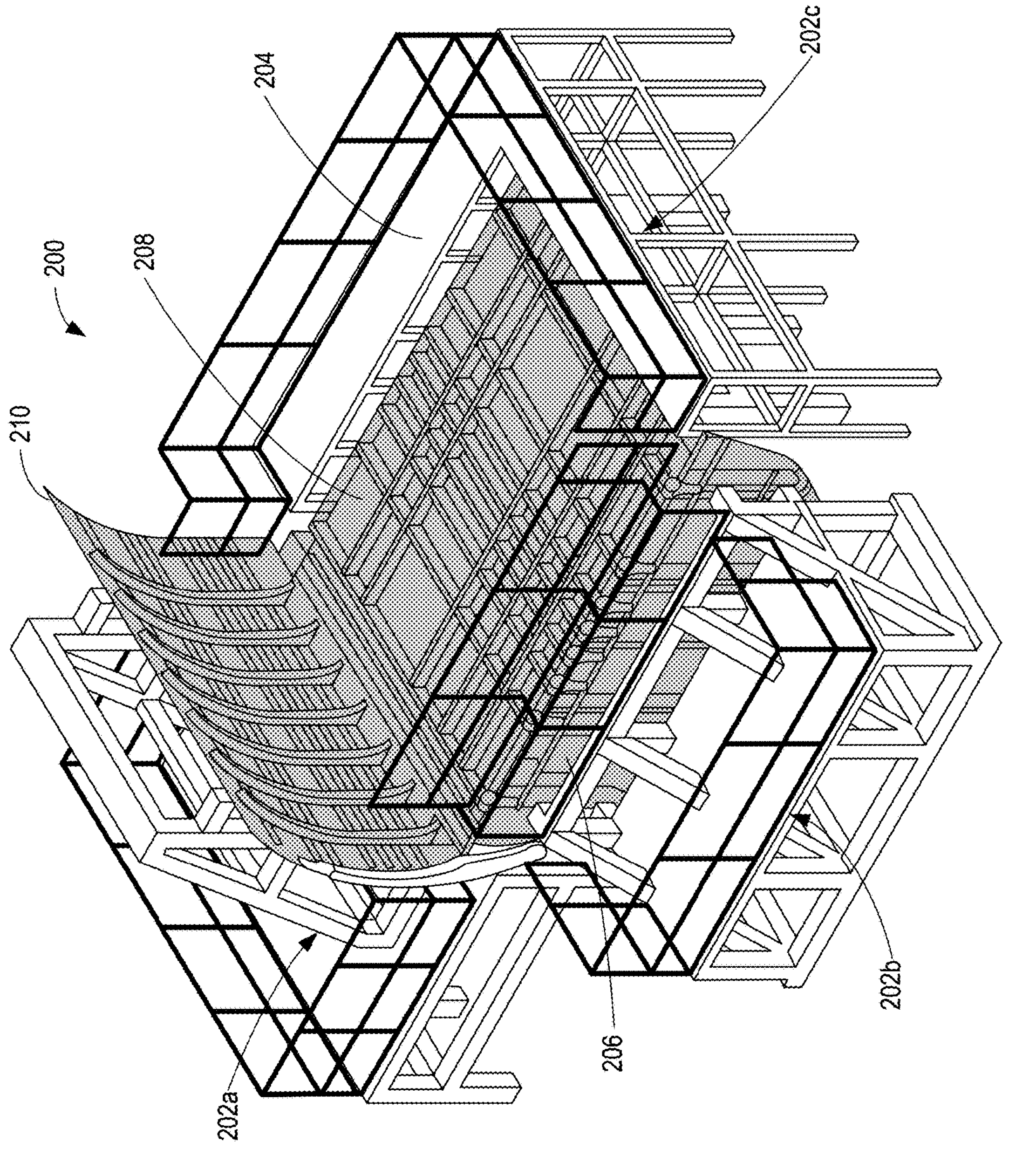
FIGS. 2A-2C illustrate an example manufacturing installation in which examples disclosed herein can be implemented.
Figure 2B:
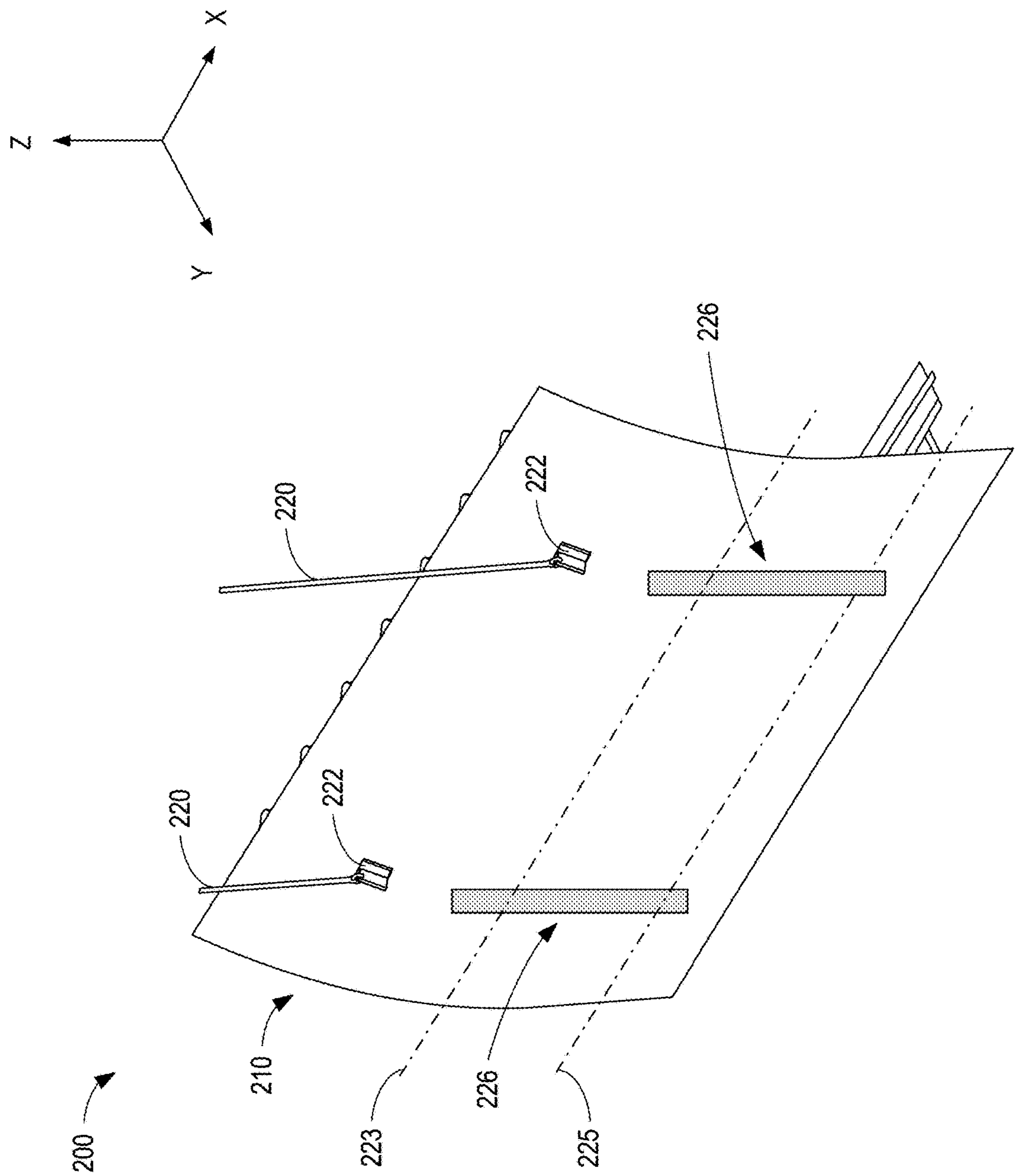
Figure 2C:
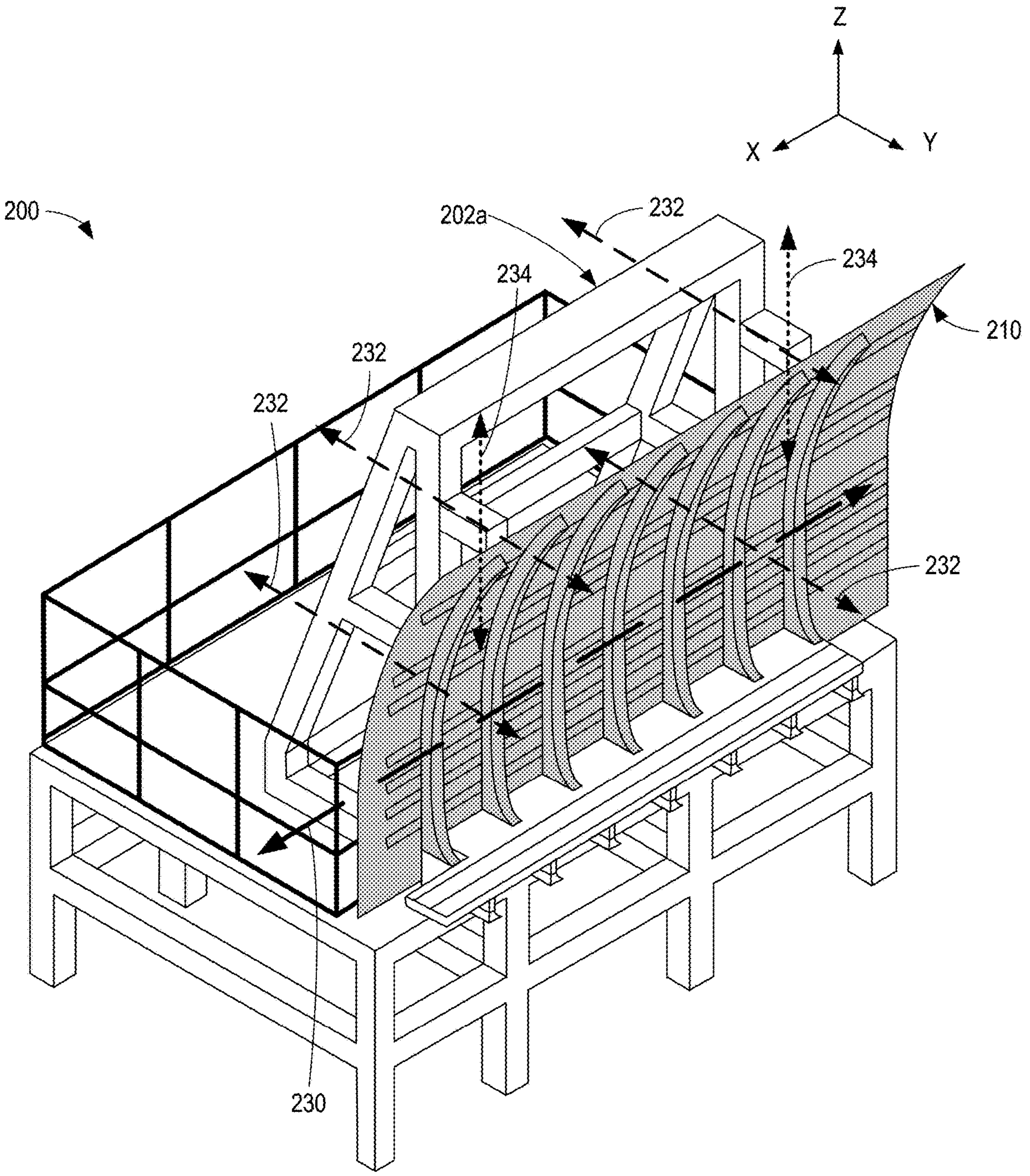

FIGS. 2A-2C illustrate an example manufacturing installation 200 in which examples disclosed herein can be implemented. Turning to FIG. 2A, the example manufacturing installation 200 includes holding fixtures 202 (hereinafter holding fixtures 202*a*, 202*b*, 202*c*, etc.) as well as a side scaffolding 204. In the illustrated view of FIG. 2A, the example manufacturing installation 200 is depicted supporting a bulkhead assembly 206, a floor panel 208 and a side skin subassembly 210 of the example aircraft 100.

FIG. 2B illustrates the side skin subassembly 210 being supported for manipulation by the example manufacturing installation 200. According to examples disclosed herein, lines 220 are depicted supporting the side skin assembly 210 at points (e.g., support points, joints, hoist interfaces, etc.) 220. As seen in the illustrated view of FIG. 2B, a surface (e.g., an external surface, a skin surface, etc.) 222 is shown with reference regions 226 depicted with corresponding hinge lines 223, 225. According to examples disclosed herein, the regions 226 correspond to tool interface features, regions and/or areas that enable relatively precise manipulation and/or movement of the side skin assembly 210. Examples disclosed herein enable relatively precise manipulation and/or movement of devices, components and/or assemblies in multiple degrees of freedom.

FIG. 2C depicts a portion of the example manufacturing installation 200 with the holding fixture 202*a* supporting and/or carrying the side skin assembly 210. Motion and/or movement of the side skin assembly 210 according to examples disclosed is depicted. In the illustrated example of FIG. 2C, the side skin assembly 210 can be translated as generally indicated by arrows 230, 232, 234. In this example, the side skin assembly 210 can be translated along a direction generally indicated by the arrow 230 via sliders or any other appropriate translational movement device. According to examples disclosed herein the arrows 232 correspond to translational movement of the side skin assembly 210 that is toward and away from the holding fixture 202*a*.

Figure 3:
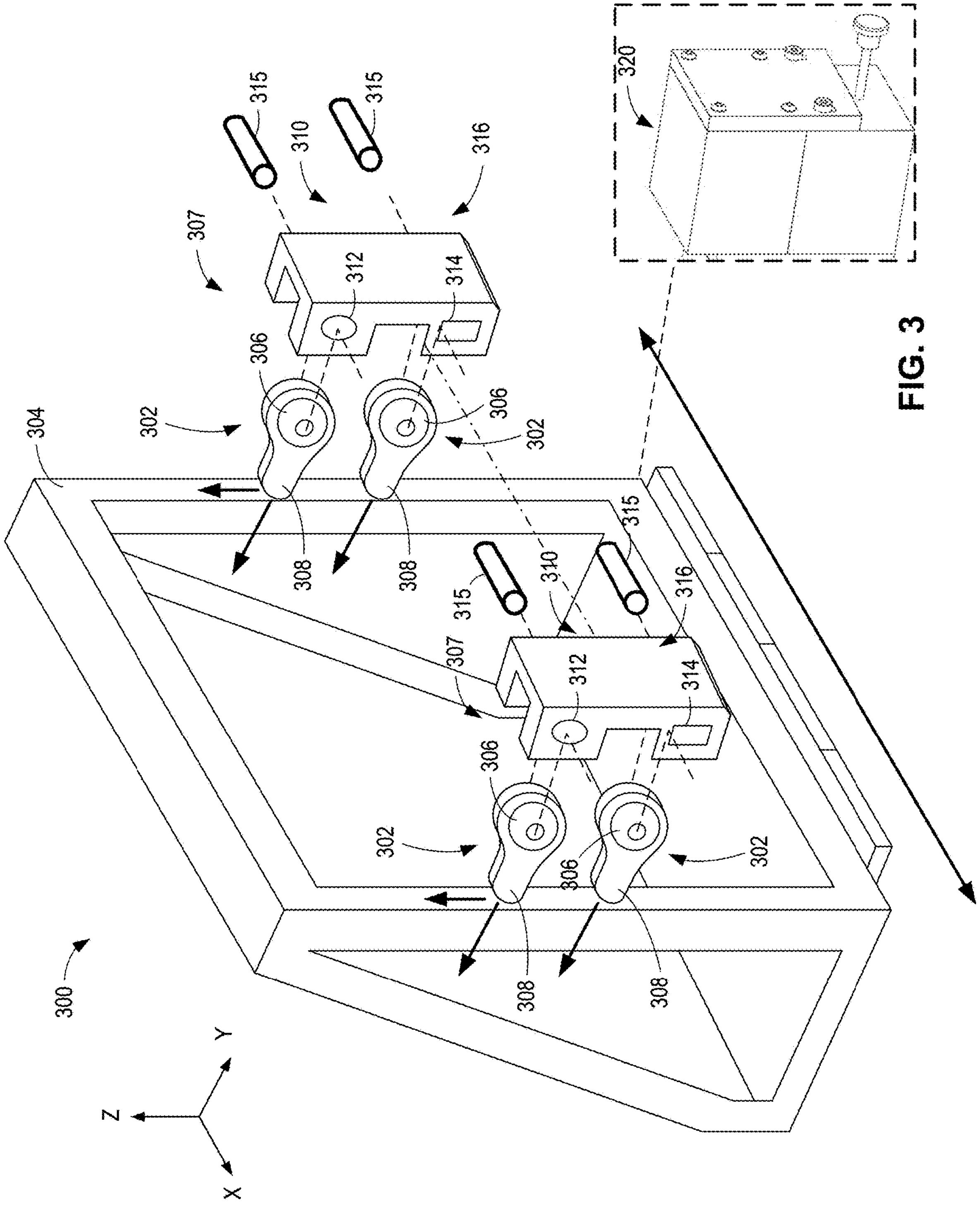
FIG. 3 illustrates an example manipulation device in accordance with teachings of this disclosure.

FIG. 3 illustrates an example manipulation device 300 in accordance with teachings of this disclosure. The example manipulation device 300 includes a slider 302 extending relative to a support frame 304. In turn, the example sliders (e.g., slider assemblies, slider portions, etc.) 302 each include a bearing (e.g., a spherical bearing, a rotational bearing, etc.) 306, and an arm (e.g., a body, an arm attachment, a tie rod, an arm attachment, etc.) 308. The example manipulation device 300 further includes mounts (e.g., clevises, clevis lugs, etc.) 310 that are laterally spaced apart (e.g., horizontally spaced apart) from one another (in the view of FIG. 3). According to examples disclosed herein, pairs of the slider 302 and the mount 310 define a ball and socket joint 307 therebetween with the slider 302 defining and/or including a ball portion of the ball and socket joint 307 while the mount 310 defines and/or includes a socket portion of the ball and socket joint 307.

The example mounts 310 include apertures 312, 314 to at least partially receive respective pins 315. According to examples disclosed herein, the aperture 312 is generally round and/or circular while, in contrast, the aperture 314 is generally slotted (e.g., a rectangular slot, a rounded slot, etc.). In this example, the mounts 310 each include a surface 316 to be coupled to a component (e.g., an aircraft section, an aircraft panel, an aircraft skin, etc.). In particular, the mounts 310 and/or the surfaces 316 can be coupled to the component via a fastener (e.g., a mechanical fastener, a chemical fastener, etc.) for manipulation thereof.

To enable precise manipulation of the component, the sliders 302 are moved (e.g., pivoted, translated, etc.) to position and orient the mounts 310 and, in turn, the component coupled to and/or supported by the mounts 310. In some examples, the sliders 302 are moved along a longitudinal direction thereof. Additionally or alternatively, the example sliders 302 are moved simultaneously. As will be discussed in greater detail below in connection with FIGS. 4-12, examples disclosed herein enable movement of the component in multiple degrees of freedom with relatively high precision. In accordance with teachings of this disclosure, examples disclosed herein utilize a ball and socket joint between each interface of the mounts 310 and the respective sliders 302. According to examples disclosed herein, at least one aperture defining a movement of at least one of the ball and socket joints is a slot and/or exhibits slotted characteristics to enable translation of the slider 302 relative to a respective one of the mounts 310. As a result, examples disclosed herein enable manipulation of the component in multiple degrees of freedom via movement of the sliders 302.

In some examples, the mount 310 can further include a z-axis movement assembly 320 to adjust the position of a component supported by the mount 310 along the z-direction. For example, the mount 310 can include and/or be positioned proximate a plurality of the movement assemblies 320, each corresponding to at least one of the respective sliders 302 to adjust a position of a vehicle panel components, for example. In other examples, the movement assembly 320 can move the component in the z-direction. In some examples, the support frame 304 can be translated with respect to the component. In some examples, multiple ones of the sliders 302 can be moved simultaneously.

Figure 4:
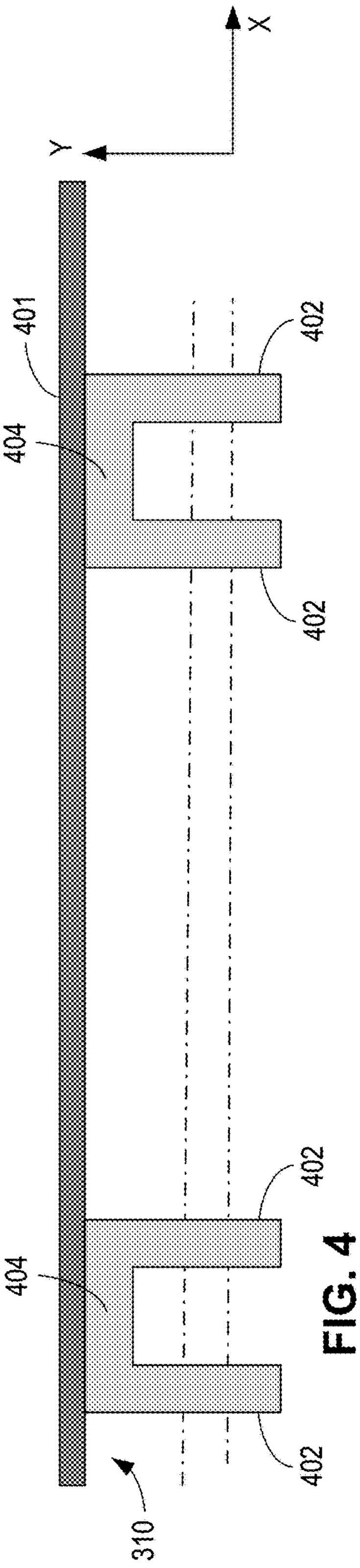
FIG. 4 illustrates a top view of an example mount of the manipulation device of FIG. 3.

FIG. 4 illustrates a top view of the example mount 310 of the manipulation device 300 of FIG. 3. In the illustrated example of FIG. 4, a panel (e.g., an aircraft panel, a fuselage panel, a panel assembly, a vehicle component panel, etc.) 401 is shown coupled (e.g., fastened, releasably coupled, etc.) to the mount 310. In turn, the example mount 310 includes walls (e.g., lateral walls, lateral sides, flanges, side walls, etc.) 402 extending from a base (e.g., a body) 404, thereby defining a c-shaped cross-sectional profile viewed along the z-axis of the coordinate system shown in FIG. 4. Accordingly, the example mount 310 defines a clevis and/or a clevis device/structure/assembly with a portion of the slider 302 (not shown) at least partially extending through and/or captured by the walls 402 in this example. In other words, the example mount 310 is generally c-shaped as viewed in FIG. 4. Additionally, in some examples, a shim and/or a spacer is placed at, proximate or on the lateral walls 402 to at least partially constrain or restrict the slider 302. In some such examples, one of the mounts or one side of the mounts 310 includes the shim and/or the spacer.

Figure 5:
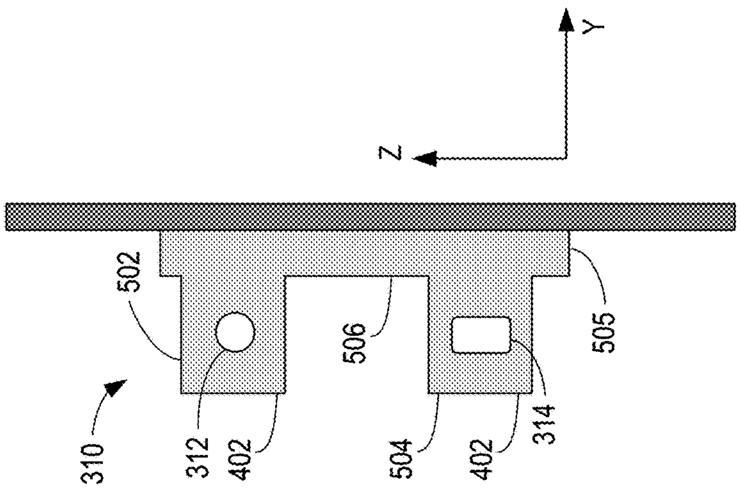
FIG. 5 illustrates a side view of the example mount shown in FIG. 4.

FIG. 5 illustrates a side view of the example mount 310 described and shown in connection with FIGS. 3 and 4. In the illustrated example of FIG. 5, the wall 402 is at least partially defined by tabs 502, 504 extending from a base 505. Accordingly, the tabs 502, 504 are shown separated from one another via a notch 506 therebetween. As mentioned above in connection with FIG. 3, the tab 502 of the illustrated example includes the generally circular and/or elliptical aperture 312 while, in contrast, the tab 504 includes the slotted aperture 314. Accordingly, precise controlled movement of the panel 401 is enabled based on the apertures 312, 314 guiding and/or restraining movement of the sliders 302 (not shown). As will be discussed below in greater detail with FIGS. 6A-8B, examples disclosed herein enable a wide array of precise manipulation of components based on relatively simple motion of the sliders 302.

Figures 6A, 6B, 6C:
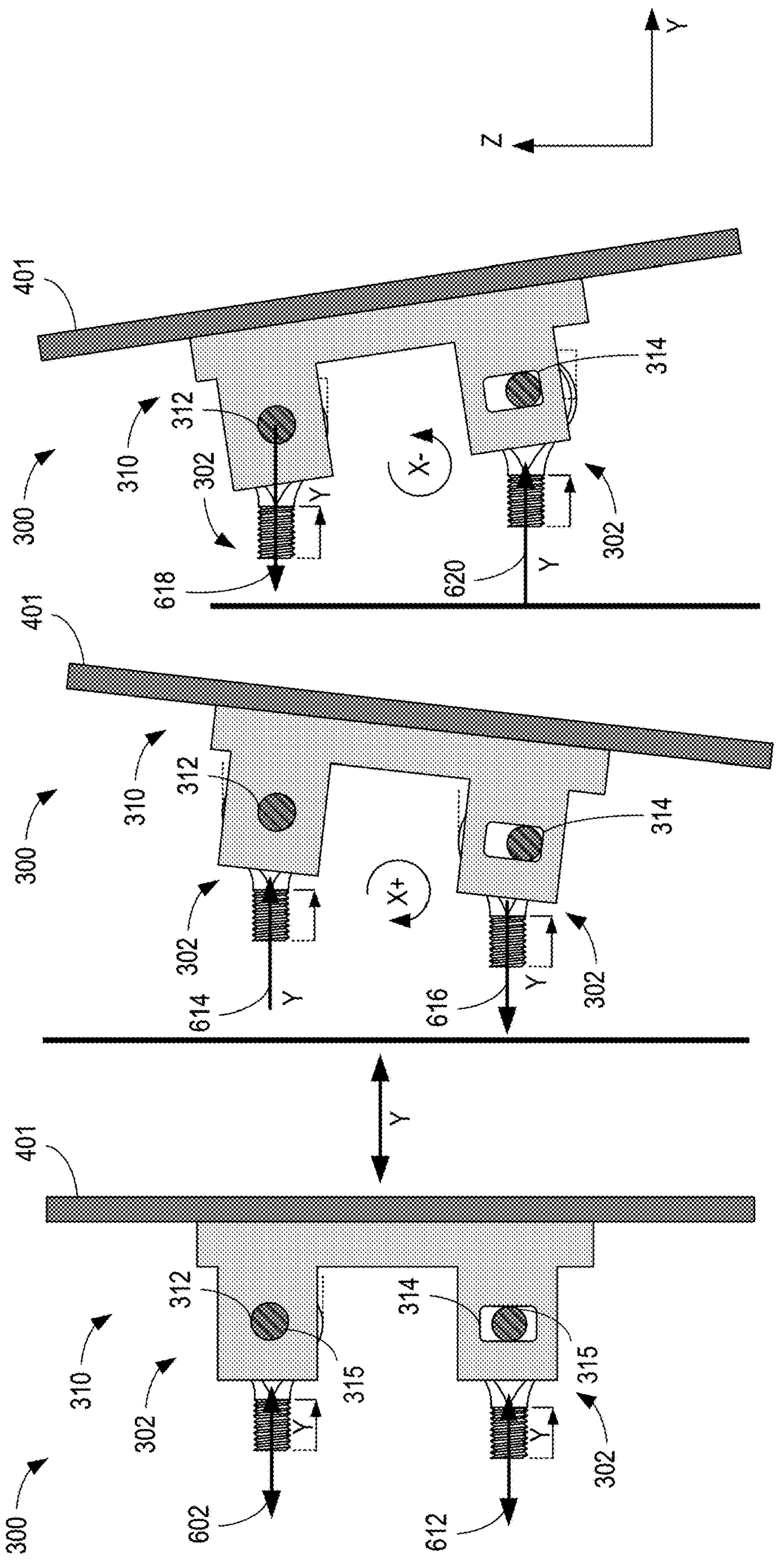

FIGS. 6A-8B illustrate example manipulation that can be performed by examples disclosed herein. In the illustrated view of FIGS. 6A-6C, side views of the example manipulation device 300 supporting the panel 401 in different orientations are shown. Turning to FIG. 6A the manipulation device 300 is shown moving the panel 401 in different orientations. On the left portion of FIG. 6A, double arrows 602, 612 illustrate potential movement of the sliders 302 with the pins 315 engaging the apertures 312, 314 for rotation of the mount 310 and, thus, the panel 401.

As can be seen in FIG. 6B, arrows 614, 616 depict movement of the upper and lower sliders 302 in different directions. In the illustrated example, the upper and lower sliders 302 are moved in opposing directions to rotate the mount 310 along with the panel 401 about a positive direction of rotation about the x-axis.

In FIG. 6C, arrows 618, 620 depict movement of the upper and lower sliders 302 in different directions from those corresponding to the arrows 614, 616. In this example, the upper and lower sliders 302 are moved in opposing directions corresponding to the arrows 614, 616 to rotate the mount 310 along with the panel 401 about a negative direction of rotation about the x-axis.

As can be seen in FIGS. 6A-6C, the combination of the sliders 302 along with the apertures 312, 314 enables controlled movement of the panel 401, which advantageously enable manipulation for assembly of the panel 401 relative to another component and/or assembly of the aircraft 100.

Figures 7A, 7B, 7C:
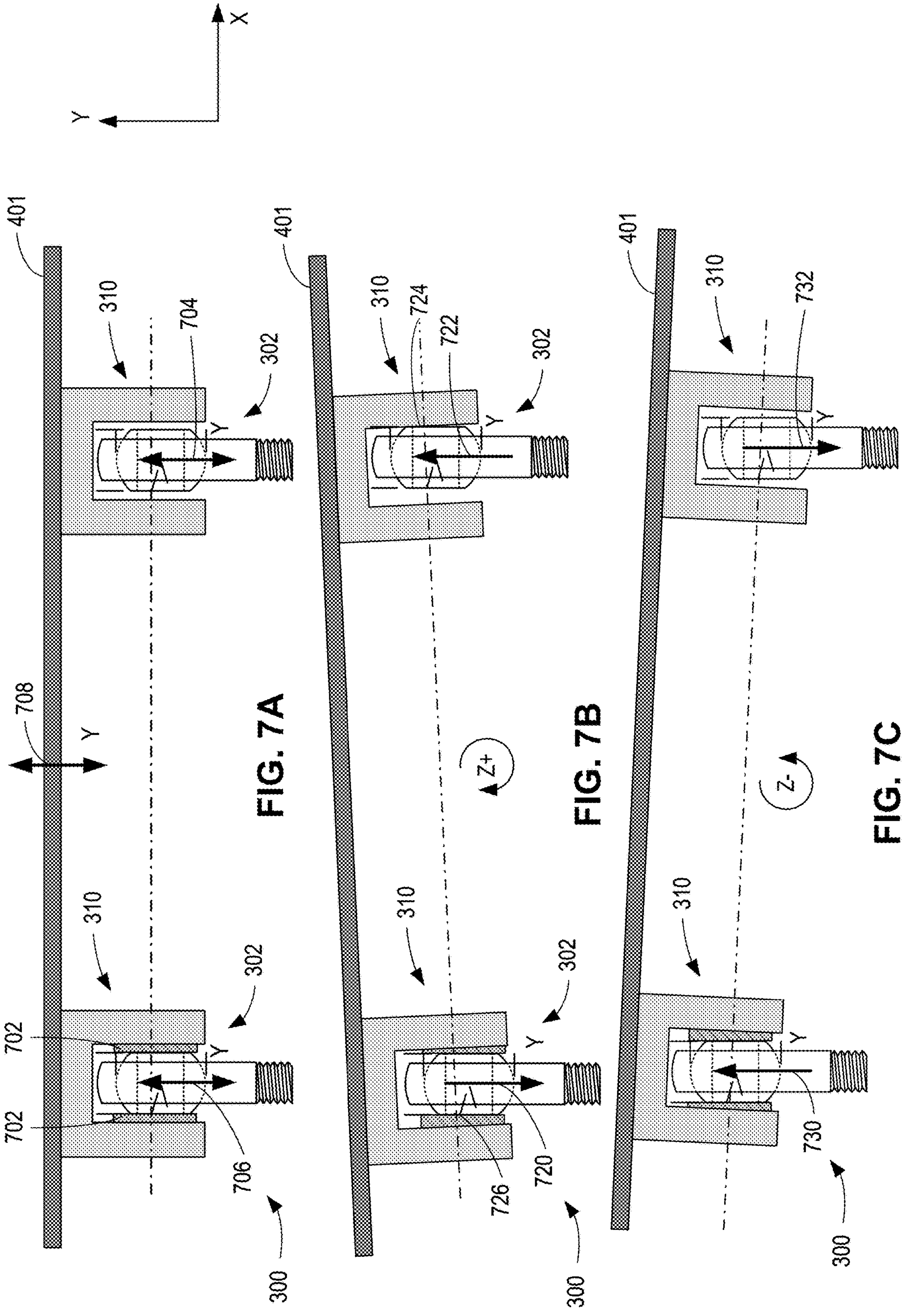

FIGS. 7A-7C illustrates top views of the manipulation device 300 supporting panel 401 in different orientations. In the illustrated examples of FIGS. 7A-7C, the mounts 310 are shown supporting the panel 401. In some examples, a spacer 702 is implemented on one of the interfaces between the mounts 310 and the sliders 302. The spacer 702 can prevent excessive play between the mounts 310 and the sliders 302. Further, preventing play between the mounts 310 and the sliders 302 enables a fixed location along the x-axis. Turning now to FIG. 7A, double arrows 704, 706 indicate movement of the sliders 302 that can be utilized to displace the panel 401 in the y-direction as well as rotate the panel 401 about an axis of rotation corresponding to the z-direction. Further, a double arrow 708 depicts potential displacement of the panel 401.

In the illustrated example of FIG. 7B, arrows 720, 722 generally indicate opposing movement of the sliders 302. Accordingly, the panel 401 is rotated about the z-axis in a positive direction of rotation. In this example, one of the sliders 302 depicted on the right side of FIG. 7C contacts the mount 310 at a surface 724 while another of the sliders 302 on the left side is constrained by at least a surface 726. In other words, differing and/or opposing forces provided along longitudinal directions of the sliders 302 can be utilized to rotate the panel 401 about the clockwise and counter-clockwise z-directions.

FIG. 7C depicts arrows 730, 732 corresponding to a rotation of the panel 401 in a negative z-direction. In this particular example, the rotation of the panel 401 is in an opposite direction from that depicted in FIG. 7B as a result of forces being applied longitudinally to the sliders 302 in opposite directions from the example of FIG. 7B.

In some examples, a gap is defined between the spacer 702 and the sliders 302. In such examples, the gap enables relatively small movement of the sliders 302 relative to the spacer 702 and the mounts 310. Further, the gap enables fine adjustment of the panel 401 about the x-axis.

Figure 8A:
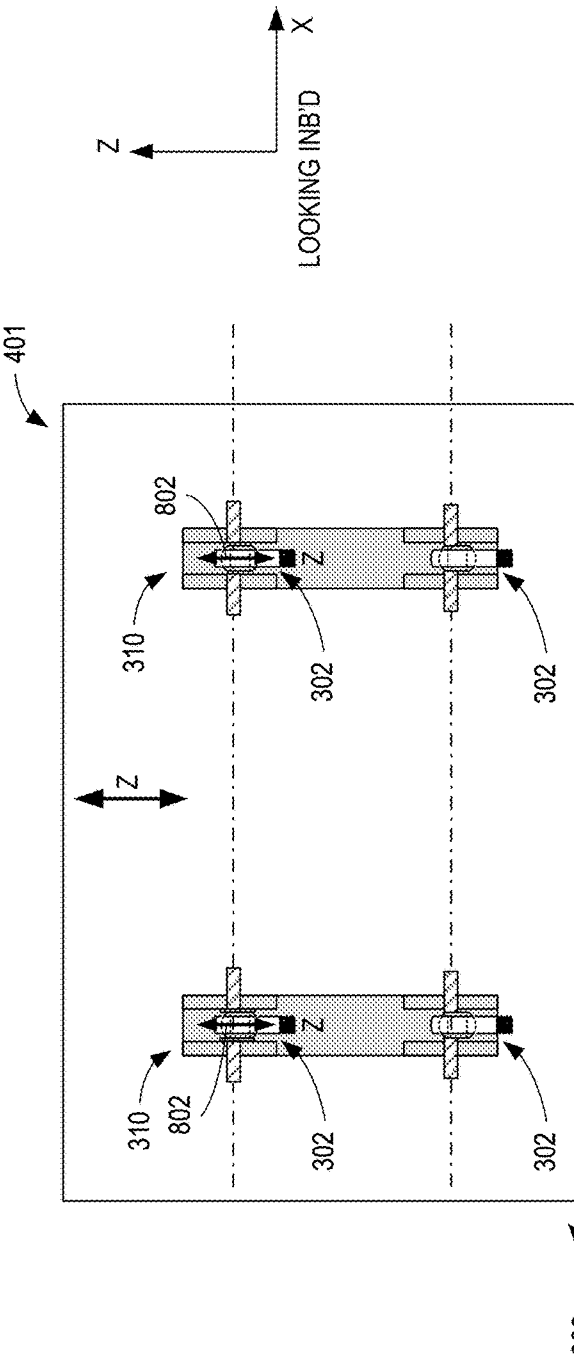
Figure 8B:
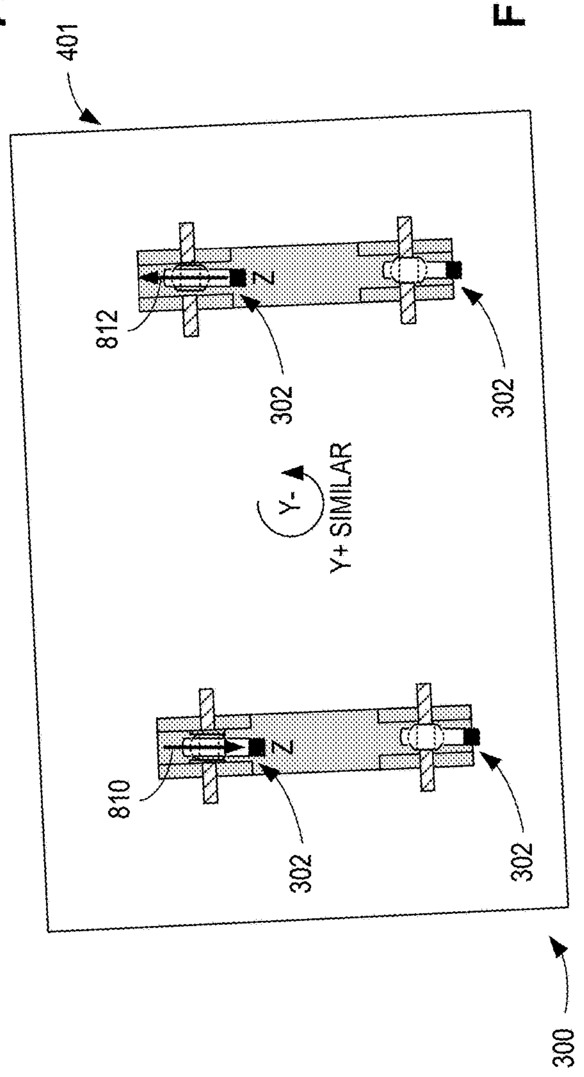

FIGS. 8A and 8B illustrate rotation of the panel 401 about the y-axis via the example manipulation device 300. Turning to FIG. 8A, the mounts 310 are depicted with the upper sliders 302 (shown in FIG. 8A) depicted with double arrows 802 depicting movement (e.g., translational movement) thereof. According to examples disclosed herein, the movement of the sliders 302 along the direction(s) indicated by the double arrows 802 (e.g., translational movement of the upper sliders 302 in the z direction) can move and/or rotate the panel 401 about the y-axis, thereby enabling efficient controlled movement and manipulation the panel 401 (e.g., for assembly other components and/or assemblies).

FIG. 8B illustrates the example manipulation device 300 rotated about the y-axis in a negative direction. In the illustrated example of FIG. 8B, a left slider 302 is moved downward, as generally indicated by an arrow 810, while a right slider 302 is moved upward in the z-direction, as generally indicated by an arrow 812.

Figure 9:
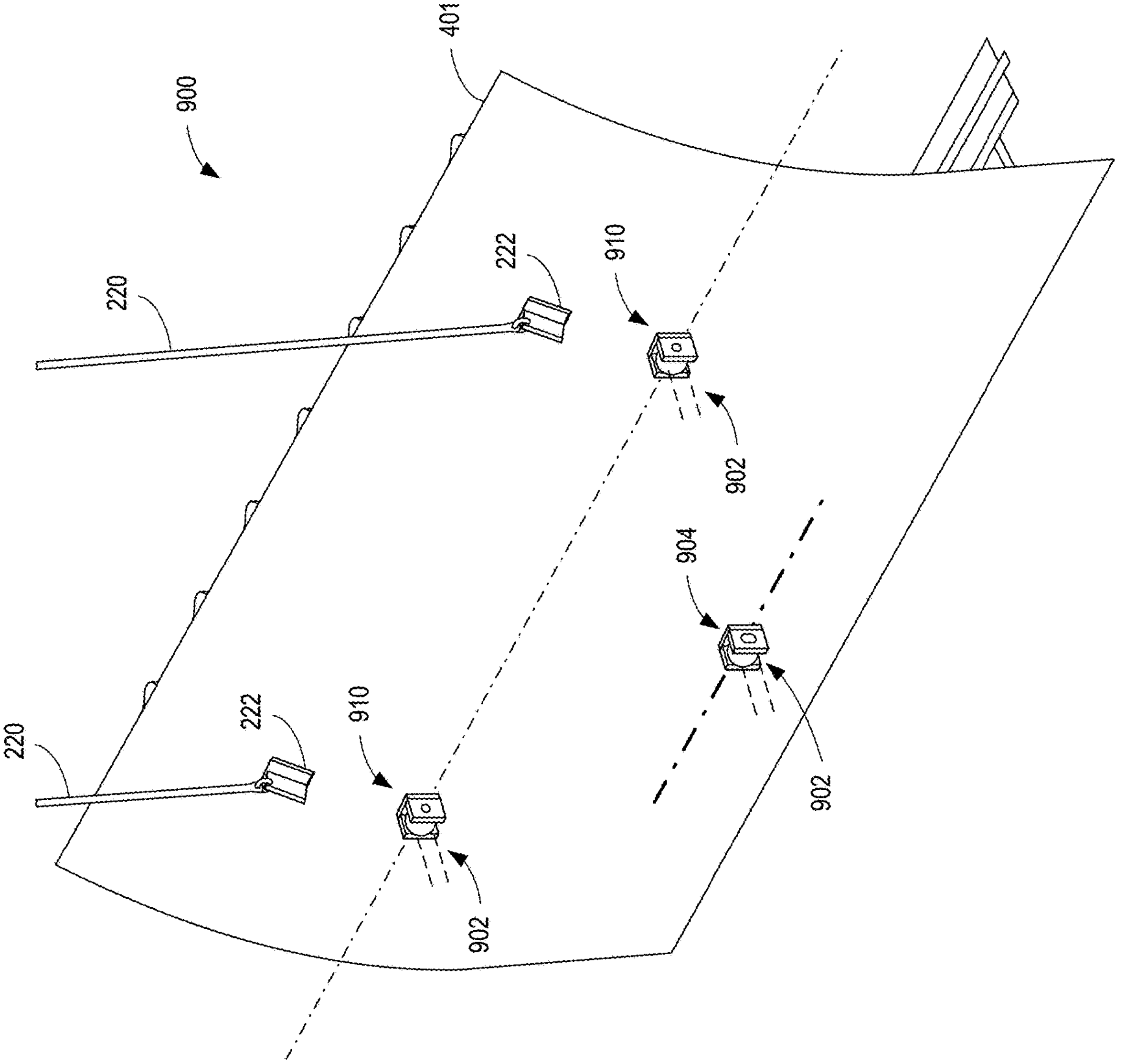
FIG. 9 illustrates another example manipulation device in accordance with teachings of this disclosure.

FIG. 9 illustrates an example manipulation device 900 in accordance with teachings of this disclosure. As can be seen in FIG. 9, the panel 401 is supported by the lines 220 via the supports 222. The example manipulation device 900 of the illustrated example includes sliders 902, a mount 904 having a slotted aperture to enable translation and rotational motion of the respective slider 902, and mounts 910, each of which include a relatively circular or round aperture to enable rotational motion.

To enable precise manipulation of the panel 401, the sliders 902 are moved (e.g., pivoted, translated, etc.) to position and orient the mounts 904, 910 and, in turn, the panel 401 coupled to the mounts 904, 910. As will be discussed in greater detail below in connection with FIG. 10, examples disclosed herein enable movement of the panel 401 in multiple degrees of freedom. In accordance with teachings of this disclosure, examples disclosed herein utilize a ball and socket joint between each interface of the mounts 904, 910 and the respective sliders 902. According to examples disclosed herein, at least one aperture defining a movement of at least one of the ball and socket joints is slotted (e.g., vertically slotted) to enable translation of the slider 902 relative to a respective one of the mounts 904, 910. In this example, the mount 904 is laterally arranged (in the view of FIG. 9) between the mounts 910, thereby defining a triangular arrangement (e.g., a triangular-shaped arrangement) of the mounts 904, 910.

Figure 10:
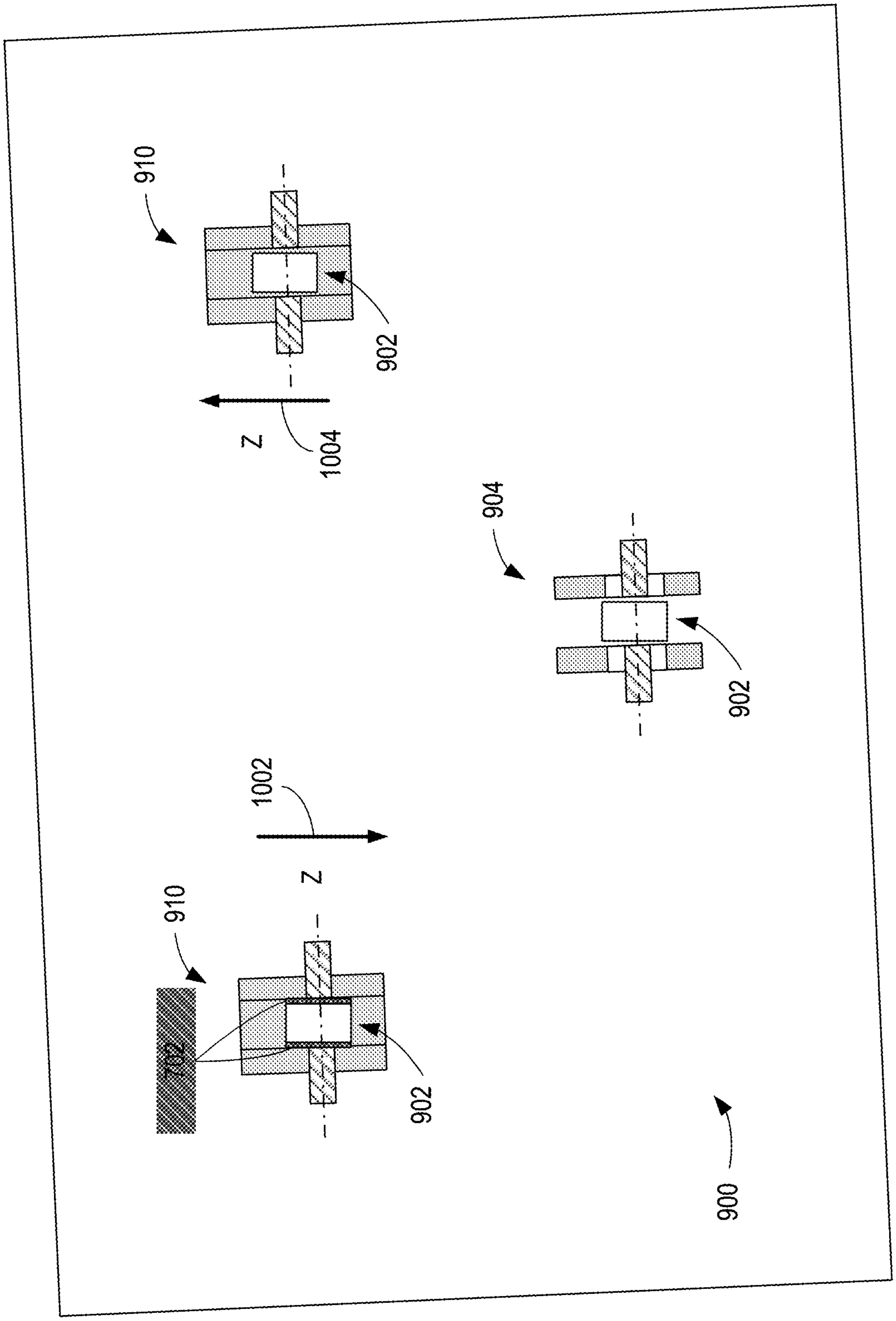
FIG. 10 is a detailed view of the example manipulation device of FIG. 9.

FIG. 10 is a detailed view of the example manipulation device 900 of FIG. 9. In the illustrated example of FIG. 10, the manipulation device 900 is shown with the mounts 904, 910 being manipulated by respective ones of the sliders 902. The slider 902 in the lower portion of FIG. 10 can move with respect to the corresponding mount 904. In particular, the slotted aperture of the mount 904 enables the respective slider 902 to translate and/or pivot. As a result, the panel 401 can be moved in multiple degrees of freedom (e.g., six degrees of freedom) with a relatively precise degree of control. In some examples, the manipulation device 900 includes the spacer 702 to prevent excessive play between one of the mounts 910 and its respective slider 902. Preventing and/or reducing play in the manipulation device 900 enables a fixed location and/or restraint of the panel 401 along the x-axis. Accordingly, in an example, the movement (e.g., the translational movement) of the mounts 910 via the corresponding sliders 902 in opposing directions (e.g., opposing directions upward and downward in the view of FIG. 10) as generally indicated by arrows 1002, 1004 will rotate the panel 401. Further, similar to the example manipulation device 300, moving the sliders 902 of the manipulation device 900 into/out of the view of FIG. 10 will rotate the panel 401 in multiple different directions and/or axes of rotation. In this example, the panel 401 can be manipulated in six degrees of freedom.

The example manipulation device 900 can move the panel 401 in similar degrees of freedom as described above in connection with FIGS. 3-8B. Further, the example manipulation device 900 is advantageously efficient with respect to reduction of friction and relatively ease with respect to manipulation thereof.

According to some examples disclosed herein, a z-adjustment device (e.g., the z-adjustment movement assembly 320) is implemented to control movement of the mounts 904, 910 and, in turn, the panel 401. For example, the z-adjustment device may be utilized to control the positioning of the panel 401 along the z-direction in relatively small movement increments.

Figure 11:
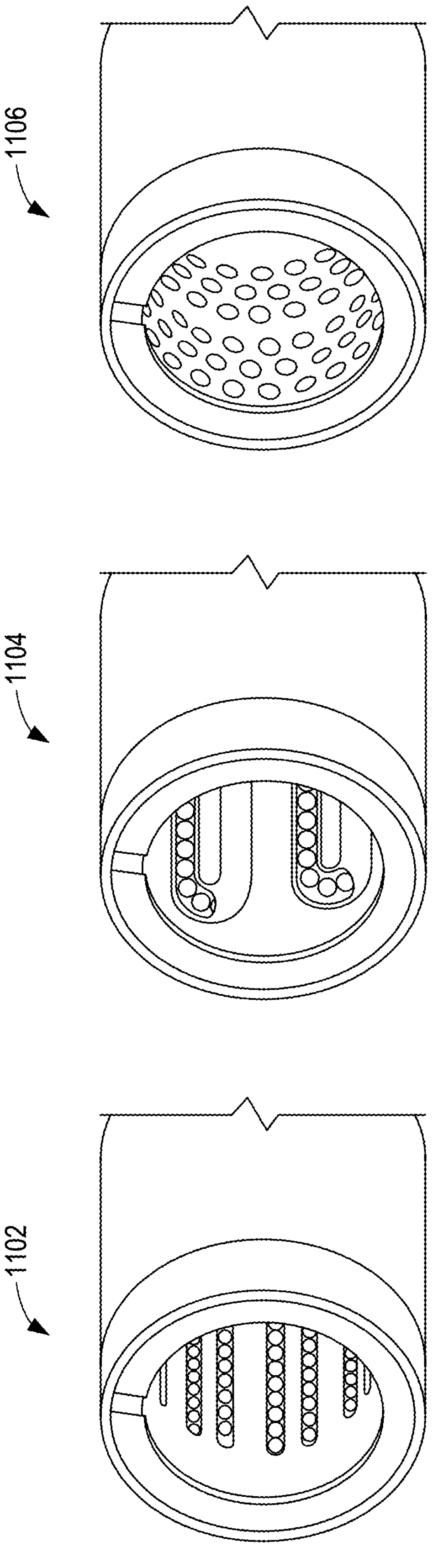
FIG. 11 illustrates example bearings that can be implemented in examples herein.

FIG. 11 illustrates example bearing implementations that can be implemented in examples disclosed herein. In particular, the bearing implementations can be utilized to at least partially define a ball and socket joint between a slider and a mount (e.g., a clevis-based mount). As mentioned above in connection with FIGS. 2-10, a spherical bearing can be implemented in examples disclosed herein.

According to examples disclosed herein, a bearing 1102 can be implemented. The example bearing 1102 is a slide rotary bushing. In the illustrated view of FIG. 11, a bearing 1104 corresponds to a rotary linear bushing that can be implemented in examples disclosed herein. Further, a bearing 1106 corresponds to a linear stroke rotary bushing. Any of the examples disclosed herein can be implemented to define a ball and socket joint between a mount (e.g., a clevis) and a slider and/or a slider attachment.

The example bearing implementations depicted in FIGS. 2-11 are examples and any other appropriate bearings and/or rotational coupling can be implemented instead. Further, any appropriate arrangement of mounts (e.g., clevis lugs) can be implemented instead. Moreover, any appropriate feature, component and/or arrangement can be used in any other of the examples.

Figure 12:
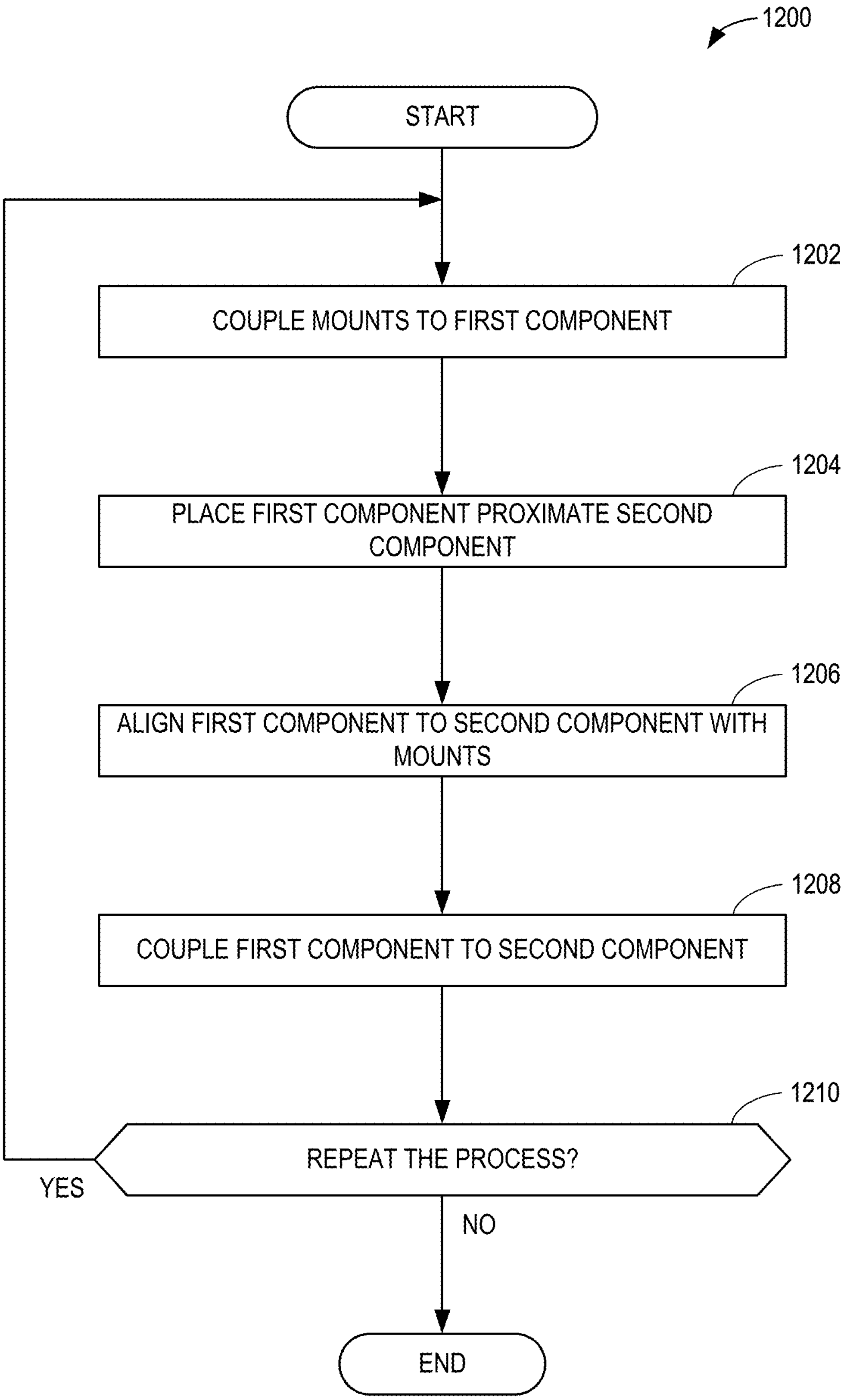
FIG. 12 is a flowchart representative of an example method in accordance with teachings of this disclosure.

FIG. 12 is a flowchart representative of an example method 1200 in accordance with teachings of this disclosure. The example method 1200 begins as a first component (e.g., a skin assembly, a fuselage assembly, an aircraft subsection, etc.) is to be manipulated (e.g., translated, rotated, etc.) to be assembled to a second component. In this example, the first component is supported and/or carried by a support frame while the second component is held in a relatively stationary manner. The example method 1200 begins at block 1202, at which mounts (e.g., the mounts 310, the mounts 904, 910, etc.) are coupled to the first component.

At block 1204 the first component is moved proximate the second component. According to examples disclosed herein, each of the mounts coupled to the first component are rotationally coupled to a respective slider via a ball and socket joint. In the illustrated example of FIG. 12, at least one of the ball and socket joints is translatable (e.g., via a slotted aperture) to enable motion and/or orientation control of the first component.

At block 1206 the mounts coupled to the first component are moved and/or adjusted to align the first component relative to the second component. According to examples disclosed herein, the mounts are moved by sliders and the interaction of the sliders with the mounts enables movement of the first component in six degrees of freedom.

At block 1208, the first component is coupled to the second component. In the illustrated example of FIG. 12, the first component is spliced with the second component. In particular, the first component is spliced to the second component based on the manipulation of the first component via the aforementioned sliders.

At block 1210, it is determined whether to repeat the process. If the process is to be repeated (block 1210), control of the process returns to block 1202. Otherwise, the process ends.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

Example methods, apparatus, systems, and articles of manufacture to enable relatively precise multi-axis precision adjustment manipulation of components, devices sand/or assemblies. Further examples and combinations thereof include the following:

Example 1 includes an apparatus to manipulate a frame component, the apparatus comprising a support, a first mount to be coupled to the frame component, the first mount operatively coupled to the support via a first ball and socket joint that can rotate relative to the first mount, and a second mount to be coupled to the frame component, the second mount operatively coupled to the support via a second ball and socket joint that can rotate and translate relative to the second mount.

Example 2 includes the apparatus as defined in example 1, including a third mount to be coupled to the component, the third mount operatively coupled to the support via a third ball and socket joint for the third mount that can rotate relative to the third mount.

Example 3 includes the apparatus as defined in any one or more of examples 1 or 2, wherein the second mount is laterally positioned between the first and third mounts.

Example 4 includes the apparatus as defined in any one or more of examples 1 to 3, wherein each of the first and second mounts includes a c-shaped channel with a lateral clearance to the respective first, second and third ball and socket joints.

Example 5 includes the apparatus as defined in any one or more of examples 1 to 4, wherein at least one of the first or second mounts has a lateral clearance to the first and second ball and socket joints, respectively.

Example 6 includes the apparatus as defined in any one or more of examples 1 to 5, including a first slider extending between the first mount to the support, and a second slider extending between the second mount to the support.

Example 7 includes the apparatus as defined in any one or more of examples 1 to 6, wherein the component includes at least one of an aircraft section or a panel.

Example 8 includes a mount for supporting a vehicle frame component, the mount comprising a body having a base with first and second walls extending therefrom at opposing lateral sides, the first and second walls including (i) a circular aperture and (ii) a slotted aperture, the body to be coupled to the vehicle frame component, and a first rotational bearing and a second rotational bearing positioned between the first and second walls, the first rotational bearing operatively coupled to the circular aperture, the second rotational bearing operatively coupled to the slotted aperture.

Example 9 includes the mount as defined in example 8, wherein the body, the first wall and the second wall define a c-shaped channel.

Example 10 includes the mount as defined in any one or more of examples 8 or 9, wherein the c-shaped channel includes a notch between the slotted aperture and the circular aperture.

Example 11 includes the mount as defined in any one or more of examples 8 to 10, further including first and second arms extending from the respective first and second rotational bearings.

Example 12 includes the mount as defined in any one or more of examples 8 to 11, wherein the first wall and the second wall define a lateral clearance to the first and second rotational bearings.

Example 13 includes the mount as defined in any one or more of examples 8 to 12, wherein the first rotational bearing and the second rotational bearing include spherical bearings.

Example 14 includes a method of manipulating a first vehicle panel component relative to a second vehicle panel component, the method comprising coupling mounts to the first vehicle panel component, the mounts including opposing circular apertures and opposing slotted apertures, wherein rotational bearings are positioned between the opposing circular apertures and the opposing slotted apertures, and moving the mounts to manipulate the first vehicle panel component relative to the second vehicle panel component.

Example 15 includes the method as defined in example 14, including coupling a shim or a spacer to at least one of the mounts to restrain motion of at least one of the rotational bearings.

Example 16 includes the method as defined in any one or more of examples 14 or 15, wherein moving the mounts includes moving spherical bearings that are positioned between lateral walls of the mounts, the lateral walls having a clearance to the respective spherical bearings.

Example 17 includes the method as defined in any one or more of examples 14 to 16, wherein moving the mounts includes moving the mounts in six degrees of freedom.

Example 18 includes the method as defined in any one or more of examples 14 to 17, wherein the opposing slotted apertures enable corresponding ones of the rotational bearings to translate.

Example 19 includes the method as defined in any one or more of examples 14 to 18, wherein moving the mounts includes moving multiple corresponding sliders simultaneously.

Example 20 includes the method as defined in any one or more of examples 14 to 19, including coupling the first vehicle panel component to an assembly by moving the mounts.

From the foregoing, it will be appreciated that example systems, apparatus, articles of manufacture, and methods have been disclosed that enable precision controlled movement and/or manipulation of components that would ordinarily be difficult to manipulate and/or align. Examples disclosed herein enable precise manipulation of relatively large components and/or assemblies and, thus, can facilitate assembly and/or processing thereof.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to manipulate a component for a vehicle, the apparatus comprising:

a support;

a first mount to be coupled to the component, the first mount operatively coupled to the support via a first ball and socket joint, the first ball and socket joint to move in a round opening of the first mount to enable rotation of the first mount relative to the support; and a second mount to be coupled to the component, the second mount operatively coupled to the support via a second ball and socket joint, the second ball and socket joint to move in a slotted opening of the second mount to enable rotation and translation of the second mount relative to the support.

2. The apparatus as defined in claim 1, including a third mount to be coupled to the component, the third mount operatively coupled to the support via a third ball and socket joint, the third ball and socket joint to move in a round opening of the third mount to enable rotation of the third mount relative to the support.

3. The apparatus as defined in claim 2, wherein the second mount is laterally positioned between the first and third mounts.

4. The apparatus as defined in claim 1, wherein each of the first and second mounts includes a c-shaped channel with a lateral clearance to the respective first and second ball and socket joints.

5. The apparatus as defined in claim 1, wherein at least one of the first or second mounts has a lateral clearance to the first and second ball and socket joints, respectively.

6. The apparatus as defined in claim 1, including:

a first slider extending between the first mount to the support; and a second slider extending between the second mount to the support.

7. The apparatus as defined in claim 1, wherein the component includes at least one of an aircraft section or a panel.

8. The apparatus as defined in claim 1, wherein the component includes a panel for an aircraft.

* * * * *